Feb. 12, 1957 R. E. HECKERT ET AL 2,781,359
CYCLOHEXENE-4,5,4,5-TETRACARBOXYLIC
DIIMIDES AND PREPARATION OF SAME
Filed Dec. 21, 1953
FIG. I.
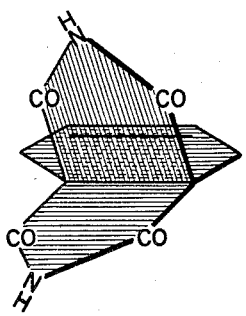
FIG. II.
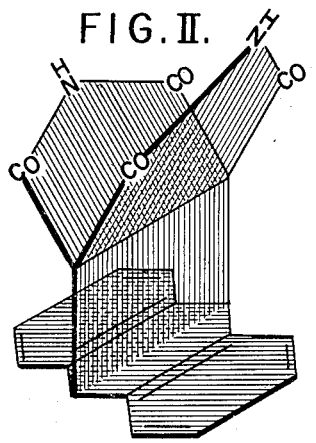
FIG. III.
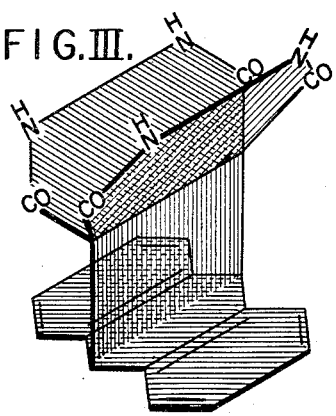
FIG. V.
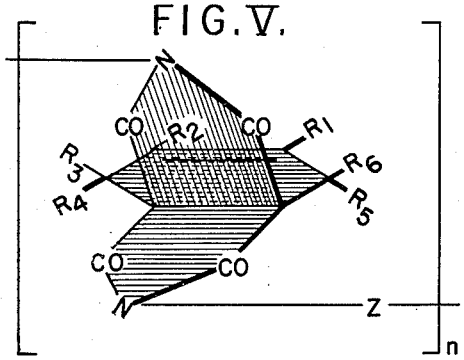
FIG. IV.
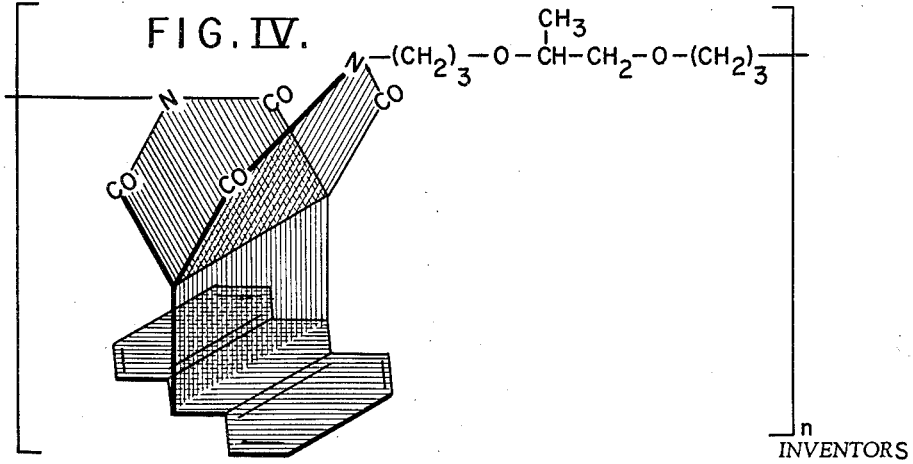
INVENTORS
RICHARD EDWIN HECKERT
WILLIAM JOSEPH MIDDLETON
BY
ATTORNEY

United States Patent Office 2,781,359
Patented Feb. 12, 1957

2,781,359

CYCLOHEXENE-4,5,4,5-TETRACARBOXYLIC DIIMIDES AND PREPARATION OF SAME

Richard Edwin Heckert, Wilmington, and William Joseph Middleton, Monroe Park, Wilmington, Del., assignors to E. I. du Pont de Nemours & Company, Wilmington, Del., a corporation of Delaware Application December 21, 1953, Serial No. 399,565

5 Claims. (Cl. 260—326)

This invention relates to organic compounds and the preparation of same and, more particularly, to a new class of diimides and to the process of preparing same.

An object of the present invention is to provide a new class of diimides and a process of preparing same. A further object is to provide a new class of such compounds readily converted to other compounds. Other objects will be apparent from the description of the invention given hereinafter.

The above objects are accomplished according to the present invention by hydrolyzing 4,4,5,5-tetracyano-1-cyclohexenes in acidic aqueous media to form cyclohexene-4,5,4,5-tetracarboxylic diimides. The invention further comprises, as a new class of compounds, the cyclohexene-4,5,4,5-tetracarboxylic diimides.

4,4,5,5-tetracyano-1-cyclohexenes can be readily obtained by reacting tetracyanoethylene with conjugated dienes at relatively low temperatures below 100° C. This is disclosed in U. S. application Ser. No. 399,566, filed of even date herewith, in the names of R. E. Heckert and N. E. Searle. The tetracyanoethylene

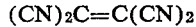

(CN)₂C=C(CN)₂ used in the preparation of the 4,4,5,5-tetracyano-1-cyclohexenes can be prepared by the reaction of sulfur monochloride with malononitrile, conveniently in the presence of an inert liquid diluent, and thereafter separating the tetracyanoethylene formed from the reaction mixture.

Those skilled in the art would immediately recognize that hydrolysis of 4,4,5,5-tetracyano-1-cyclohexenes should represent a readily available route to the corresponding tetracarboxylic acids which, having malonic acid structures, should readily lose two molecules of carbon dioxide to give the corresponding dibasic acids. It has now been found that hydrolysis of these 4,4,5,5-tetracyano-1-cyclohexenes in acidic aqueous media proceeds not to the expected tetracarboxylic acids but, surprisingly, stops with the formation of the corresponding cyclohexene-4,5,4,5-tetracarboxylic diimides, a new class of compounds. These diimides readily react with hydrazine to form the corresponding dihydrazides and they also react with diamines to form exceptionally stable, high molecular weight polyimides.

The cyclohexene-4,5,4,5-tetracarboxylic diimides of this invention can be prepared by the acid hydrolysis of the corresponding 4,4,5,5-tetracyano-1-cyclohexenes, alternatively named 4 - cyclohexene - 1,1,2,2 - tetracarbonitriles, represented by the formula

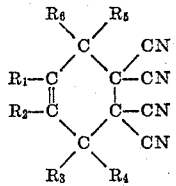

wherein R₁, R₂, R₃, R₄, R₅ and R₆ can be any of the monovalent substituents attached to carbon in organic compounds such as hydrogen, halogen, alkoxyl, cyano, thiocyano, nitro, alkyl (including unsaturated alkyl), aryl, acyl, and the like, including structures in which any two R positions represent the points of attachment for a diradical forming a bridge in the cyclohexene.

In a preferred embodiment of this invention, 4,4,5,5-tetracyano-1-cyclohexene is heated in boiling aqueous sulfuric acid for several hours until its conversion to the corresponding diimide is indicated by the entire mass becoming dissolved in the aqueous acid. The diimide is recovered by cooling the solution to cause precipitation, and the precipitated diimide is purified by recrystallization from water.

The following examples wherein all proportions are by weight unless otherwise stated, illustrate the preparation of specific cyclohexene-4,5,4,5-tetracarboxylic diimides according to the present invention. Reference is made in the examples to the accompanying drawing in which the various figures illustrate graphically specific molecules or units of polymeric molecules, the shading in the figures being solely for the purpose of more clearly designating planes.

Example I

A mixture of 515 parts of concentrated sulfuric acid and 400 parts of water is cooled to 0° C. and added to 43 parts of 4,4,5,5-tetracyano-1-cyclohexene which can be alternatively named 4-cyclohexene-1,1,2,2-tetracarbonitrile (prepared by reacting tetracyanoethylene with butadiene). The mixture is heated under reflux. At the end of 3 hours, the solid is dissolved and at the end of 5 hours' heating is discontinued. Upon cooling, a white solid precipitates. The solid is collected, washed with cold water, and then recrystallized from water. Glistening white plates of cyclohexene-4,5,4,5-tetracarboxylic diimide or, alternatively named, 4-cyclohexene-1,2,1,2-tetracarboxylic diimide, are obtained which do not melt below 300° C. This compound is sufficiently acidic to dissolve in a 5% sodium bicarbonate solution and is recovered unchanged from this solution by acidification.

Analysis.—Calcd. for $C_{10}H_8O_4N_2$: C, 54.57; H, 3.66; N, 12.73. Found: C, 54.67, 54.81; H, 3.81, 3.73; N, 12.97, 12.66.

The infrared spectrum shows strong absorptions at 5.75 micron for carbonyl and at 3.15 micron for N—H bond. The analytical data are in accord with the structure shown in Fig. I of the drawing.

This same compound is obtained by hydrolysis of 4,4,5,5-tetracyano-1-cyclohexene with a boiling formic acid-hydrochloric acid mixture.

Example II

Fifteen parts of 1,2-benzo-4,4,5,5-tetracyano-3,6-o-benzeno-1-cyclohexene, alternatively named 3,6-o-benzenobenzo(a) - 4 - cyclohexene - 1,1,2,2 - tetracarbonitrile (prepared by reacting tetracyanoethylene with anthracene) is heated with 238 parts of concentrated hydrochloric acid in a sealed Hastelloy bomb with rocking at 150° C. for 8 hours. Upon cooling, the solid residue is dissolved in 10% sodium hydroxide, treated with activated carbon and filtered. The filtrate is acidified with hydrochloric acid, and the white precipitate that forms is recrystallized from alcohol-water. There is obtained 4.6 parts of 1,2-benzo-3,6-o-benzeno-1-cyclohexene-tetracarboxylic diimide, alternatively named 3,6-o-benzenobenzo(a) - 4 - cyclohexene - 1,2,1,2-tetracarboxylic diimide, in the form of white needles, M. P.>300° C. This compound is sufficiently acidic to dissolve in a 5% sodium bicarbonate solution and is recovered unchanged from this solution by acidification.

*Analysis.*—Calcd. for $C_{20}H_{12}O_4N_2$: C, 69.76; H, 3.51; N, 8.13. Found: C, 69.77, 69.88; H, 3.73, 3.68; N, 8.34, 8.30.

The infrared absorption spectrum shows a strong band at 5.75 micron for carbonyl and a band at 3.05 micron for N—H. The analytical data are in accord with the structure shown in Fig. II of the drawing.

This compound is also obtained by hydrolysis of the tetracyanoethylene/anthracene adduct with a boiling formic acid-hydrochloric acid mixture. Attempted further hydrolysis of the diimide with sulfuric acid produces either a carbonaceous material or has no effect on the diimide, depending upon the concentration of the acid and the degree of heat applied.

A suspension of 33 parts of this diimide and 100 parts of hydrazine hydrate in 395 parts of ethyl alcohol is heated under reflux for 4 hours. The solution is cooled, and the white precipitate is collected and washed with alcohol. There is obtained 33.3 parts of 2,3,4a,5,10,10a-hexahydro - 5,10 - o - benzeno - 4a,10a - methanodiimino-methanobenzo(g)-phthalazine-1,4,11,14-tetrone in the form of a white powder which does not melt below 300° C.

*Analysis.*—Calcd. for $C_{20}H_{14}O_4N_4$: C, 64.17; H, 3.77; N, 14.97. Found: C, 64.09, 64.08; H, 3.89, 3.89; N, 14.87, 14.87.

The analytical data are in accord with the structure shown in Fig. III of the drawing.

One hundred seventy-seven and thirty-nine hundredths parts of the diiimide of this example and 98.04 parts of 1,2-bis(3-aminopropoxy)propane are dissolved in ethyl alcohol and an atmosphere of nitrogen is maintained over the mixture throughout the remainder of the preparation. The alcohol is removed by gradually heating the mixture to 110° C. at atmospheric pressure. The mixture is then heated for ½ hour at about 140° C. with no apparent change. During the next half hour it is heated at 195° C. There is a vigorous evolution of ammonia and the molten mixture becomes viscous. Reaction of the diimide with the bis(3-aminopropoxy)-propane to form a polymeric imide is completed by heating for ½ hour at 280° C. The resulting hard, brittle polymer weighs 180 parts. It softens at 150–160° C., is soluble in m-cresol, dimethylformamide and chloroform, and has an inherent viscosity of 0.37 as a 0.5% solution in m-cresol at 25° C.

The above polymerization of the diimide of this example with 1,2-bis(3-aminopropoxy)propane is repeated using pyridine as the solvent in place of alcohol. The resulting hard polymer weighs 234 parts. It softens at 150–160° C., and has an inherent viscosity of 0.38 as a 0.5% solution in m-cresol at 25° C. These polyimides can be represented by the structural formula shown in Fig. IV.

It will be understood that the above examples are merely illustrative and that the present invention broadly comprises hydrolyzing 4,4,5,5-tetracyano-1-cyclohexenes in acidic aqueous media to form cyclohexene-4,5,4,5-tetracarboxylic diimides, as well as the cyclohexene-4,5,4,5,-tetracarboxylic diimides as a new class of compounds.

These cyclohexene-4,5,4,5-tetracarboxylic diimides can be prepared by acid hydrolysis of 4,4,5,5-tetracyano-1-cyclohexenes in general. While all the specific tetracarboxylic diimides of this invention are cyclohexene-4,5,4,5-tetracarboxylic diimides and all of the starting compounds hydrolyzed to give these diimides, are 4,4,5,5-tetracyano-1-cyclohexenes, each of the compounds may be alternately named. Accordingly, throughout the specification, each specific compound has been named alternately for the sake of clarity.

In addition to those of the examples, suitable 4,4,5,5-tetracyano-1-cyclohexenes for the preparation of the diimides of the instant invention include: 4,4,5,5-tetracyano-3,6-ethano-1-cyclohexene, alternately, 3,6-ethano-4-cyclohexene-1,1,2,2-tetracarbonitrile; 4,4,5,5-tetracyano-2-(4-methyl-3-pentenyl)-1-cyclohexene, alternately, 5-(4-methyl-3-pentenyl)-4 - cyclohexene - 1,1,2,2 - tetracarbonitrile; 10bH-naphtho(2,1-b)-4-cyclohexene-1,1,2,2-tetracarbonitrile (there is no tenable method for numbering this compound as a 1-cyclohexene although it is a 4,4,5,5-tetracyano-1-cyclohexene); 4,4,5,5-tetracyano-1,2-dimethyl-1-cyclohexene, alternately, 4,5-dimethyl-4-cyclohexene-1,1,2,2-tetracarbonitrile; 1-chloro-4,4,5,5-tetracyano-1-cyclohexene, alternately, 4-chloro-4-cyclohexene-1,1,2,2-tetracarbonitrile; and 4,4,5,5-tetracyano-3,6-methano-1-cyclohexene, alternately, 3,6-methano-4-cyclohexene-1,1,2,2-tetracarbonitrile. These compounds may be readily hydrolyzed to the corresponding tetracarboxylic diimides in accordance with the process of this invention.

The acid hydrolysis of this invention can be carried out under widely varying conditions. Since the presence of water is necessary for the hydrolysis, acidic aqueous media must be used in all cases. The acid functions as a catalyst and its concentration in the aqueous media is not critical but a strong acid should be used for effective operation, e. g., sulfuric acid, hydrochloric acid, and formic acid-hydrochloric acid mixtures. Conveniently, the hydrolysis is carried out at the boiling point of the acidic aqueous media although a range of 50° C. to 200° C., is in general suitable, the hydrolysis being carried out under pressure where a temperature above the boiling point of the acidic aqueous media is to be used. Otherwise, pressure is not critical. Time is a factor only to the extent of the degree of completion of the hydrolysis, the reaction normally being continued until the 4,4,5,5-tetracyano-1-cyclohexene becomes completely dissolved.

The cyclohexene-4,5,4,5-tetracarboxylic diimides of this invention form an entirely new class of compounds which possess extremely high thermal and hydrolytic stability. They afford an invaluable means of preparing a large number of compounds heretofore unknown or at least impractically difficult to synthesize. These tetracarboxylic diimides react readily with hydrazine to form the corresponding 2,3,4a,6,7,8a-hexahydropyridazo(4,5-d)pyridazine-1,4,5,8-tetrones.

It is of particular interest that the tetracarboxylic diimides of this invention react with diamines with the loss of two molecular equivalents of ammonia to form the corresponding polyimides. These may be represented by the structural formula shown in Fig. V in which formula the R's can be any of the monovalent substituents attached to carbon in organic compounds such as hydrogen, halogen, alkoxyl, cyano, thiocyano, nitro, alkyl (including unsaturated alkyl), aryl, acyl, and the like, including structures in which any two R positions represent the points of attachment for a diradical forming a bridge in the cyclohexene, and Z is a divalent organic radical derived from a diamine by removal of two —NH₂ groups. Because of their high softening temperatures, these polyimides are highly useful as molded objects. When care is exercised to obtain starting materials of the highest purity and to use exact molecular equivalents of the diimide and diamine, polyimides are obtained which have inherent viscosities (at 0.5% concentration in m-cresol at 25° C.) greater than 1. Such polyimides can be melt-spun into orientable filaments characterized by excellent strength, toughness, and chemical durability.

The tetracarboxylic diimides of this invention are useful as insecticides and insect repellents, particularly for flies and mosquitoes. For this use they are compounded with suitable solvents, extenders, and adjuvants to give compositions which can be applied for spraying, dusting or other means known in the art of applying such compositions to plants, animals, or inanimate objects where protection from insects is desired.

As many apparently widely different embodiments of this invention may be made without departing from the spirit and scope thereof, it is to be understood that the

The invention claimed is:

1. As a new class of compounds, cyclohexene-4,5,4,5-tetracarboxylic diimides.
2. Cyclohexene-4,5,4,5-tetracarboxylic diimide.
3. 3,6-o-benzenobenzo(a)-4-cyclohexene-1,2,1,2-tetracarboxylic diimide.
4. Process of preparing a cyclohexene-4,5,4,5-tetracarboxylic diimide which comprises hydrolyzing a 4,4,5,5-tetracyano-1-cyclohexene in acidic aqueous media.
5. Process of preparing a cyclohexene-4,5,4,5-tetracarboxylic diimide which comprises boiling a 4,4,5,5-tetracyano-1-cyclohexene in aqueous sulfuric acid until a solution is formed, and cooling said solution to precipitate the diimide formed.

References Cited in the file of this patent

UNITED STATES PATENTS

| | | |
|---|---|---|
| 2,264,354 | Alder et al. | Dec. 2, 1941 |
| 2,436,919 | Gertler | Mar. 2, 1948 |
| 2,628,963 | Laucius et al. | Feb. 17, 1953 |

OTHER REFERENCES

Beilstein, 4th ed., Main Work XXIV, pp. 519 and 521.

Chem. Abst., vol. 43, p. 7182 (1949) citing U. S. Dept. of Agri. Bur. of Entomol. and Plant Quarantine, E777.

Chem. Abst., vol. 45, p. 10475 (1951), citing Jr. Econ. Entomol., vol. 44, 428–29 (1951).